United States Patent [19]

Gerum et al.

[11] Patent Number: 4,869,965

[45] Date of Patent: Sep. 26, 1989

[54] PROCESS FOR THE PRODUCTION OF A MAGNETIC RECORDING MEDIUM

[75] Inventors: Johannes Gerum, Unterpfaffenhofen; Heinrich Kober, Hohenschaeftlarn; Walter Meckel, Neuss-Uedesheim, all of Fed. Rep. of Germany

[73] Assignee: AGFA-Gevaert Aktiengesellschaft, Leverkusen, Fed. Rep. of Germany

[21] Appl. No.: 134,217

[22] Filed: Dec. 16, 1987

[30] Foreign Application Priority Data

Dec. 19, 1986 [DE] Fed. Rep. of Germany ....... 3643458

[51] Int. Cl.[4] ............................................. H01F 10/02

[52] U.S. Cl. ................................ 428/425.9; 427/128; 427/130; 427/131; 427/132; 427/365; 428/457; 428/694; 428/900

[58] Field of Search ............... 427/128, 131, 130, 132, 427/340, 365; 428/900, 694, 425.9, 457

[56] References Cited

U.S. PATENT DOCUMENTS 3,748,329 7/1973 Liebsch et al. ................. 260/244 R 4,728,577 3/1988 Yamada et al. .................. 428/423.7

*Primary Examiner*—Bernard Pianalto

*Attorney, Agent, or Firm*—Connolly & Hutz

[57] ABSTRACT

A magnetic recording carrier which has improved mechanical properties as a result of a highly active cross-linking reaction of the polymeric binder is produced by carrying out the cross-linking reaction by way of oligo- and/or polyurethanes and/or polyureas containing oxadiazine trione rings in the presence of hydroxyl groups and/or aliphatic amino groups. The oligo- and polyurethanes containing the oxadiazine trione ring are reaction products of A polyisocyanates with a functionality of from 1.95 to 2.05, preferably from 1.99 to 2.01 and B compounds containing predominantly two zerewitinoff active hydrogen atoms, selected from hydroxyl and/or amino compounds in the molecular weight range of from 18 to 6000.

under the condition that the ratio of isocyanate groups present in A to zerewitinoff active hydrogens present in B lies in the range of from 0.75:1 to 1.1:1 and from 5 to 100 mol % of the polyisocyanate mentioned under A are polyisocyanates containing an oxadiazine trione ring, and catalytic quantities of tertiary amines and/or aliphatic polyamines are optionally added for hardening the magnetizable layer.

15 Claims, No Drawings

PROCESS FOR THE PRODUCTION OF A MAGNETIC RECORDING MEDIUM

This invention relates to a process for the production of a magnetic recording carrier consisting of a non magnetic layer support and at least one magnetisable layer applied to this support and containing finely divided magnetic pigments and binders which are converted into a polymeric network by special cross-linking reactions.

It is known that magnetic recording carriers with high storage density will only be sufficiently wear resistant if the binder system used is formed by a three-dimensionally linked network. Various methods have been proposed to achieve this.

A high molecular weight, abrasion resistant melamine resin, for example, may be obtained as a binder matrix by the reaction of hexamethylol melamine with binders containing suitable functional groups in the presence of acids as catalysts. Compounds which have been mentioned as suitable binders for this purpose include hydroxyalkylmethacrylates, alkyd resins, epoxide resins and derivatives of polyvinyl alcohols and of cellulose. This cross-linking reaction requires the use of strong acids as catalysts to enable adequate reaction velocities to be obtained but the addition of such acids leads to degradation of the polymer and hence to a drastic reduction in the stability of the tape, especially when copolymers based on polyesters/polyurethanes are present. Moreover, strong acids damage the sound heads and video heads used in particular in magnetic recording carriers with high storage density, with the result that a marked drop in recording level occurs within a short time.

Phenoxy and epoxy resins can also be linked to form a three-dimensional network in the presence of acids or bases but the catalysts required cause the same degradation of binder and corrosion of recording and playback heads as the catalysts used for the synthesis of the high molecular weight melamine resins.

The method most frequently employed for building up a high molecular weight network of binder, however, is based on the addition of compounds containing isocyanate groups to the magnetic dispersion. This, however, is liable to give rise to numerous side reactions which compete with the desired formation of linkages in the binder.

Magnetic pigments carrying low molecular weight, reactive compounds on their surface to improve their dispersibility are used in particular in magnetic recording carriers with high storage density. Amines (JP 76/153839), fatty acids (JP 77/30649) and silicones (JP 76/126713) have been described for this purpose. These compounds, however, are liable to undergo partial desorption from the pigment surface to give rise to low molecular weight compounds which destabilise the magnetisable layer.

Substances frequently added as slip additives to magnetic dispersions also give rise to undesirable side reactions with the isocyanate component. The addition of fatty acids (JP 73/82333), mono or difunctional glyceric esters (IBM Techn. Discl. Bull. 23, 1981), long chained aliphatic alcohols (JP 77/99171) and long chained alkylamines (JP 79/65799) to the magnetic dispersion causes inactivation of the compounds containing isocyanate groups, which again gives rise to the formation of low molecular weight compounds which reduce the stability of the layer.

By far the most important side reaction with the low molecular weight isocyanate component is that which takes place with the water which is carried into the magnetic dispersion with the magnetic pigment, the polymeric binder or the solvent. The water is present in molecular excess over the other isocyanate reactive components and is highly mobile due to the small size of its molecule as well as being highly reactive. In the presence of an excess water, the cross-linking component reacts to form a polyurea structure which does not include polymeric binder and therefore, although it improves the modulus of elasticity of the magnetisable layer, it does not reduce the tendency to abrasion, nor does it improve the resistance to solvents. The wear resistance of a magnetic recording carrier may be controlled not only by the degree of cross-linking but also by the polymeric binder itself in that the mechanical properties of the magnetisable layer can be adjusted in the desired direction by increasing the hardness of the binder, a high modulus of elongation and high tear resistance of the binder. These objects may be achieved by one of two methods. The required properties may be obtained by mixing a hard binder such as a phenoxy or epoxy resin, a saponified copolymer of vinyl chloride/-vinyl acetate or vinylidene chloride or a cellulose derivative with a soft polyesterpolyurethane component, but this in most cases leads to separation of the components of the mixture of the binder system due to thermodynamic incompatibility of the components. In the long term, this results in severe deterioration in all the mechanical properties of the magnetic recording carrier. Such separation of the components can be avoided in the required mechanical properties can be adjusted by means of a single polymer of if the various polymers can be prevented from separating by means of a cross-linking reaction taking place under conditions of hardening to form an interpenetrating network.

It is an object of the present invention to provide binder systems for a magnetic recording carrier which will undergo cross-linking to form a three dimensional network without the aid of polyfunctional polyisocyanates and without the disadvantages which occur in the processes used for melamine hardening.

The invention solves this problem by a process for the production of a magnetic recording carrier consisting of a non-magnetisable layer support and at least one magnetisable layer applied to this support and containing finely divided magnetic pigments and a polymeric, cross-linked matrix as binder, characterised in that the cross-linking reaction of the polymeric binder is brought about by means of oligo- and/or polyurethanes and/or polyureas containing oxadiazine-2,4,6-trione rings. The oligo- and/or polyurethanes and/or polyureas containing oxadiazine trione rings which are essential for this invention are prepared by the reaction of relatively high molecular weight and/or low molecular weight hydroxyl and/or amino compounds with substantially difunctional polyisocyanates. Examples of such diisocyanates include aliphatic, cycloaliphatic, araliphatic and aromatic polyisocyanates preferably having an isocyanate functionality of 2, such as the compounds described by W. Siefken in Liebigs Annalen 562, 75 (1948) and mentioned as preferred diisocyanate components in DE-OS 29 20 501. The following are preferred polyisocyanates: diphenylmethane-4,4'-, -4,2'- and/or -2,2'-diisocyanate, tolylene-2,4- and/or -2,6- diisocyanate, paraphenylene diisocyanate, 3,3'-dimethyldiphenyl-4,4'-diisocyanate, mono- and bis-tetra-$C_1$–$C_4$-alkyl substituted diphenylmethane-4,4'-diisocyanates and aliphatic and cycloaliphatic diisocyanates such as hexamethylene diisocyanate, trimethyl hexamethylene diisocyanate, lysine methylester diisocyanate, dicyclohexylmethane-4,4'-, -2,4'- and/or -2,2'-diisocyanate, hexahydrotolylene diisocyanates, dodecylbenzene-2,4-diisocyanate and isophorone diisocyanate.

Higher functional isocyanates may be added in small proportions of up to 5 mol%, e.g. benzene-1,3,5-triisocyanate, the polyphenyl-polymethylene-polyisocyanates described, for example, in GB-PS 874 430 and 848 671, polyisocyanates containing biuret groups, polyisocyanates containing isocyanurate groups and higher functional polyisocyanates by the reaction of trifunctional or higher functional low molecular weight polyols with excess quantities of diisocyanates.

It is essential to the present invention that from 1 to 100 mol%, preferably 5 to 100 mol% of the polyisocyanates used contain a 1,3,5-oxadiazine-2,4,6-trione ring. Polyisocyanates of this kind have been fully described in U.S. Pat. No. 3 748 329 and may be obtained by the action of carbon dioxide on polyisocyanates in the presence of a catalyst, for example tributylphosphine. These polyisocyanates are stable compounds capable of undergoing the usual polyurethane reactions without losing their oxadiazine trione ring. One particularly preferred component is the diisocyanate corresponding to the formula

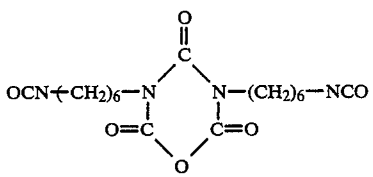

obtained by the action of carbon dioxide on hexamethylene diisocyanate in the presence of tributylphosphine as catalyst.

The relatively high molecular weight, substantially difunctional polyhydroxyl compounds in the molecular weight range of from 400 to 6000 may be any of the relatively high molecular weight polyhydroxyl compounds normally used for the preparation of polyurethanes. Typical examples may be found, for example, in DE-OS 29 20 501 and include, for example, relatively high molecular weight polyesters, polyester amides, polyethers, polyacetals and polycarbonates, preferably with molecular weights of from 800 to 3000, and compounds containing about two hydroxyl groups per relatively high molecular weight polyhydroxyl compound within the said molecular weight ranges. Hydroxyl polyesters suitable for the process include, for example, the reaction products of polyhydric, preferably dihydric alcohols and polybasic, preferably dibasic caboxylic acids, carboxylic acid esters and/or carboxylic acid anhydrides. Hydroxycarboxylic acids and lactones such as caprolactone, for example, may also be used. Suitable polyesters are also described, for example, in Houben-Weyl, volume XIV/2, pages 12 to 29, Thieme Verlag, Stuttgart 1963.

The polycarboxylic acids may be aliphatic, cycloaliphatic, aromatic or hetrocyclic. The following are examples of such carboxylic acids and their derivatives: oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, diethylsuccinic acid and 1,4-cyclohexane dicarboxylic acid. The following are examples of suitable alcohol components: ethylene glycol, diethylene glycol, triethylene glycol, 1,2- and 1,3-propane diol, 1,4-, 1,3-, 1,2- and 2,3-butane diol, 2,2,4-trimethyl pentane diol, 1,5-pentane diol, 1,6-hexane diol, 1,8-octane diol, neopentyl glycol, 1,4-bis-(hydroxymethyl)cyclohexane, 2-methyl-1,3-propane diol and alkoxylated bisphenols as well as their hydrogenation products corresponding to the following general formula:

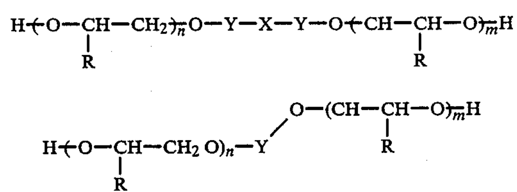

wherein $X = R_1—C—R_2$; $SO_2$ or $N—R_3$,

Y = (benzene ring) (cyclohexane ring H)

n and m=2–6

R=H or $CH_3$;

$R_1$ and $R_2$ may be identical or different and may together with X form a cycloaliphatic hydrocarbon ring with 5 to 6 carbon atoms. They may also stand for hydrogen or alkyl groups with 1 to 6 carbon atoms.

Higher functional polyols such as glycerol, triemthylpropane, 1,2,6-hexanetriol or 1,2,4-butanetriol may also be used in minor quantities (up to about 5 mol%). Polyesters of unsaturated fatty acids with a proportion of double or triple bonds and polyesters or copolyesters of lactones such as ε-caprolactone or of hydroxycarboxylic acids such as ω-hydroxycaproic acid may also be used.

The polyester amides suitable for the oligo- and/or polyurethanes described above are obtained by partial replacement of the dihydric alcohol of the polyester by amino alcohols, diamines or polyamines. Ethanolamine, ethylene diamine and hexamethylene diamine are preferred for this purpose.

The relatively high molecular weight polyhydroxyl compounds used may also be straight chained or only slightly branched polyethers preferably containing two hydroxyl groups; for example, tetrahydrofuran polymers or addition products of alkylene oxides to starting compounds. Ethylene oxide, propylene oxide, butylene oxide, styrene oxide and epihalogen hydrins are examples of suitable alkylene oxides.

The starting components used are compounds containing mobile H atoms, such as water, alcohols or amines, e.g. ethylene glycol, 1,2- and 1,3-propylene glycol, 2,2-bis-(4-hydroxyphenyl)-propane, aniline and stearylamine.

Polyacetals may also be used as polyhydroxyl compounds. These may be obtained, for example, by the condensation of formaldehyde or some other aldehyde with polyhydric alcohols of the type described above.

Polycarbonates of known kind are particularly preferred. These may be prepared, for example, by reaction of the above mentioned diol components, in particular those based on hexane-diol-(1,6), with, for example, diphenyl carbonate or phosgene.

The low molecular weight chain lengthening agents with mobile hydrogen atoms (Zerewitinoff active H atoms) used are compounds which are substantially bifunctional in their reaction with isocyanates and have molecular weights of from 18 to 399 or 32 to 399, preferably from 60 to 254. Low molecular weight diols are particularly suitable for this purpose but amino alcohols and diamines and mixtures of such chain lengthening agents are also suitable. Moreover, stepwise reactions with different chain lengthening agents may be carried out.

Suitable chain lengthening agents include diols and mixtures thereof, e.g. ethylene glycol, 1,2- and 1,3-propane diol, 1,4-, 1,3-, 1,2- and 2,3-butane diol, 1,5-pentane diol, 2,2,4-trimethylpentane diol-(1,3), 1,6-hexane diol, neopentyl glycol, 1,4-bis-(hydroxymethyl)-cyclohexane, 2-methyl-1,3-propane diol, di-, tri- and tetraethylene glycol, alkoxylated bisphenols and their hydrogenation products of the kind already described above as diol components for the preparation of polyesters, and ester diols such as hydroxypivalic acid/neopentyl glycol ester. Higher functional polyols such as trimethylol propane may also be included, preferably in proportions not greater than 5 mol%. Amino alcohols such as ethanolamine, N-methyl-ethanolamine, N-methyl-diethanolamine and 3-aminopropanol may also be used.

Aliphatic and cycloaliphatic diamines with molecular weights below 2000 are also suitable, e.g. ethylene diamine, tetramethylene diamine, 1,6-hexamethylene diamine, 1,12-dodecamethylene diamine, 1-amino-3-aminomethyl-3,5,5-trimethyl-cyclohexane, 2,4- and 2,6-hexahydrotolylene diamine, 2,4'- and 4,4'-diamino-dicyclohexylmethane, 1-amino-2-aminomethyl-3,3,5(3,5,5)-trimethyl-cyclopentane, tolylene diamine, p-xylylene diamine, 4,4'-diaminodiphenyl methane, hydrazine, methylhydrazine, N,N'-dimethylhydrazine and their homologues.

For certain special purposes, the binders may also contain ionic groups such as carboxyl, sulphonate or ammonium groups. These may be introduced by the incorporation of, for example, dimethylolpropionic acid followed by partial or complete salt formation or by the addition of sulphophthalic acid in the preparation of the polyesters or the additions of, for example,

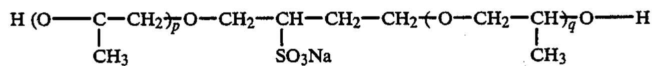

p+q=0–10

To the chain lengthening agent or by the use of polyols or chain lengthening agents containing tertiary amino groups followed by partial or complete salt formation.

The usual methods are employed for the preparation of the oligo- and/or polyurethanes. Particularly preferred is a process in which the relatively high molecular weight polyols and/or low molecular weight chain lengthening agents are reacted with the polyisocyanates, preferably in solution at temperatures from 30° to 130° C., most preferably from 40° to 80° C., to form oligomers or polymers containing isocyanate end groups and having an isocyanate content of from 0.5 to 10%, based on the solids content. Small quantities of a diamine such as isophorone diamine, 4,4'-diamino-3,3'-dimethyl-dicyclohexyl methane or N-(β-hydroxyethyl)-ethylene diamine may be added stepwise to this polymer solution until the required solution viscosity or molecular weight is obtained. Any NCO groups still present are then reacted, for example, with alcohols, dibutylamine or, preferably, oximes such as butanone oxime.

It must be emphasised again that it is essential to this invention to use diisocyanates containing oxadiazine trione groups, for example the compound corresponding to the formula

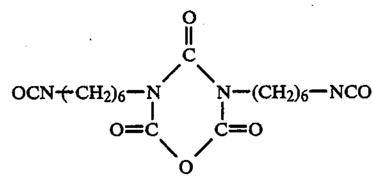

and that from 1 to 100 mol%, preferably from 5 to 100 mol% of the polyisocyanates used must contain a 1,3,5-oxadiazine-2,4,6-trione ring.

The solutions of oligourethane and/or polyurethane ureas and/or polyureas prepared as described above may be used as polymeric binders in the same way as conventional polyurethanes for the preparation of a magnetic recording carrier and after calendering they give rise to products which are highly abrasion resistant, although this depends also on the other additives and magnetic pigments used. The choice of these additives and of the magnetic pigments is well known to the man of the art working in this field.

In one particularly preferred process, polyfunctional hydroxyl compounds such as glycols, triols, hydroxylpolyols, hydroxylpolyurethanes or polymers containing hydroxyl groups are added to the magnetic dispersion and cross-linking is brought about by the addition of suitable catalysts.

Examples of suitable hydroxyl components include the starting components already mentioned above which are commonly used in polyurethane chemistry. The hydroxyl polyurethanes obtained from these components may also be used. These hydroxyl compounds are obtained by using a ratio of isocyanate groups to available hydroxyl and/or amino groups below 1, the ratio being preferably within the range of from 0.5:1.0 to 0.99:1.0.

The following methods of preparation are given by way of example:

1. Polyester- and/or polyetherpolyols are reacted with low molecular weight diols and/or diamines and optionally triols, preferably glycerol, in solution or solvent free, preferably with diisocyanates, in such quantities that the ratio of isocyanate groups to hydroxyl groups lies within the range of from 0.5:1 to 0.99:1, preferably from 0.75:1 to 0.99:1.

2. Polyester- and/or polyetherpolyols are reacted with low molecular weight diols and/or diamines and preferably diisocyanates in such proportions of NCO groups to hydroxyl groups that a polymer containing NCO end groups is obtained, and this polymer is subsequently reacted, preferably in solution, with an excess of, for example, diamines, amino alcohols, diols or triols to produce an oligomer or polymer containing amino groups or hydroxyl groups.

When bifunctional compounds are used, the products obtained are linear polymers with two hydroxyl end groups whereas trifunctional compounds such as glycerol, diethanolamine or N-(2-hydroxyethyl)-ethylene diamine give rise to polymers containing more than two hydroxyl groups.

Other preferred polymers include hydroxyl-containing polymers which may be obtained, for example, by the copolymerisation of vinyl chloride and vinyl acetate followed by partial or complete saponification of the acetyl groups, as well as hydroxylalkyl-acrylates and/or methacrylates, alkyd resins, epoxide resins and cellulose derivatives.

The following may be used as catalysts: organic metal compounds such as lead octoate, tin octoate and dibutyltin dilaurate and especially tertiary amines such as triethylamine and triethylene diamine and cyclic amidines such as 1,8-diazabicyclo(5-4.0)undec-7-ene or 1,5-diazoabicyclo(4.3.0)non-5-ene. These catalysts are preferably added to the magnetic dispersion shortly before it is applied to the non-magnetic layer support.

In another embodiment of the process, the magnetisable layer is exposed to a gaseous amine such as trimethylamine or triethylamine after the layer has been cast and and dried and before, during or after the action of the smoothing calender, optionally at an elevated temperature.

In another, particularly preferred embodiment of the process which may be employed when the oligourethane or, preferably, polyurethane containing the oxadiazine trione ring is the only binder used, an aliphatic, preferably cycloaliphatic polyamine, which is most preferably a diamine, is added to the magnetic dispersion shortly before its application to the layer support. The said polyamine is added in such a quantity that the proportion of oxadiazine trione rings present in the magnetic dispersion to the amino groups added in within the range of from 5:1 to 1:4, most preferably from 3:1 to 1:2.

Particularly preferred are the readily available cycloaliphatic diamines such as 4,4'-diamino-3,3'-dimethyldicyclohexylmethane, 5-amino-1-aminomethyl-1,3,3-trimethylcyclohexylmethane and 4,4'-diamino-dicyclohexylmethane or polyamines obtained by the reaction of ammonia with hydroxyl polyethers under pressure. The molecular weight of the polyamines should not significantly exceed 2000.

The proportion of oxadiazine trione rings in the oligo- and/or polyurethanes used may vary within wide limits but should be adjusted to the particular system used so that the cross-linking density will not be too high.

The molar proportion of polyisocyanates containing oxadiazine trione rings to the total quantity of polyisocyanates A should generally be at least 40 mol% if the polymeric binders containing the oxadiazine trione ring are to have an average molecular weight below 10,000 but for binders with molecular weights above 20,000 the molar proportion of polyisocyanates containing the oxadiazine trione ring may be reduced to 5–25 mol% of the total quantity of polyisocyanate used.

(A) Example of preparation of a polymeric binder according to the present invention.

166 g (0.0807 mol) of a hexane diol polycarbonate with OH number 54.5 are dissolved in 980 g of tetrahydrofuran. After the addition of 29.06 g (0.323 mol) of butane diol (1,4) and 20.02 g (0.323 mol) of ethylene glycol, 25.78 g (0.061 mol) of 3,5-diisocyanatohexyl-oxadiazine-2,4,6-trione and 0.53 g of a 1% solution of dibutyl tin dilaurate in tetrahydrofuran are added. After 4 hours stirring at 50° to 60° C., 179 g (0.716 mol) of 4,4'-diisocyanatodiphenylmethane are added dropwise and the reaction is continued for 6 hours at 50° to 60° C. A constant NCO value of 0.04% is obtained. The 30% solution is lengthened stepwise with a solution of isophorondiamine in tetrahydrofuran until the solution diluted to a solids content of 20% has a viscosity of 1700 mPas at 25° C. The remaining isocyanate groups are reacted by the addition of 0.18 g of butanone oxime.

(B) Example of preparation of a cross-linking agent according to the present invention.

83.2 g (0.8 mol) of neopentyl glycol and 420.6 g (1.0 mol) of 3,5-di(isocyanatohexyl)-oxadiazine-2,4,6-trione in 503.8 g of tetrahydrofuran are stirred together for 18 hours at 50° to 60° C. after the addition of 0.6 ml of a 1% solution of dibutyl tin dilaurate in tetrahydrofuran. A constant isocyanate value of 1.83% is obtained. The remaining isocyanate content is reacted by the addition of 38.2 g (0.44 mol) of butanone oxime. The 50% solution has a viscosity of 1600 mPas at 25° C. The average molecular weight calculated from the isocyanate value of 1.83% is found to be about 2300.

EXAMPLE 1

A magnetic dispersion was prepared from the following components:

| | Parts by weight |
|---|---|
| Ferromagnetic metal powder | 100 |
| Polymeric binder from example of preparation A (solids content) | 18.5 |
| n-stearic acid | 0.5 |
| Lecithin | 3.0 |
| Carbon black (average diameter 0.1 μm) | 1.0 |
| α-$Al_2O_3$ (average diameter 0.3 μm) | 2.5 |
| Isocetyl stearate | 4.0 |
| Tetrahydrofuran | 130.0 |
| Methylethylketone | 100.0 |

This preparation was ground in a ball mill for 10 hours. 0.1 part by weight of isophorondiamine was then added and grinding was continued for one more hour. After fine filtration, the dispersion was applied by means of an extrusion caster to a 10 μm thick polyethylene terephthalate foil to form a layer having a thickness of 3.5 μm when dry. The magnetic dispersion was orientated in the direction of casting by a magnetic field while still liquid. After drying, the recording carrier was calendered and then separated into strips 8 mm in width.

EXAMPLE 2

The same procedure was employed as in Example 1 but with the addition of 0.1 part by weight of 3,3'- dimethyl-4,4'-diamino dicyclohexylmethane to the dispersion instead of isophoronediamine.

COMPARISON EXAMPLE 3

A magnetic dispersion was prepared from the following components:

| | Parts by weight |
|---|---|
| Ferromagnetic metal powder | 100 |
| Vinyl chloride/vinyl acetale copolymer | 8.5 |
| Polyester/polyurethane (Estane 5707 of B. F. Goodrich) | 10.0 |
| n-stearic acid | 0.5 |
| Lecithin | 3.0 |
| Carbon black (average diameter 0.1 μm) | 1.0 |
| $\alpha$-$Al_2O_3$ (average diameter 0.3 μm) | 2.5 |
| Isocetyl stearate | 4.0 |
| Tetrahydrofuran | 130.0 |
| Methylethylketone | 100.0 |

This preparation was ground in a ball mill for 10 hours and 8 parts by weight of a polyfunctional isocyanate (Desmodur L® of Bayer AG) were then added and the preparation was ground for a further hour. The subsequent treatment was as described in Example 1.

EXAMPLE 4

The procedure was the same as in Comparison Example 3 but with the addition of 1 part by weight of the compound obtained in example of preparation B instead of 8 parts by weight of Desmodur L. In addition, 0.2 parts by weight of 1,5-diazadicyclo[5,4,0]-5-undecene were added. The subsequent treatment was as described in Example 1.

Results of the examples of application

The coercivity IHC was determined as a measure of the electroacoustic properties and the ratio of the remanent magnetisation to the saturation magnetisation $M_R/M_S$ in the longitudinal direction was determined as a measure of the orientation of the magnetic pigments. The magnetic recording carriers of Examples 1 to 4 had comparable properties.

The stability of the still picture was also determined. Strips 8 mm in width were packaged into an 8 mm cassette of the kind commonly used in the art. A signal of 5 $MH_z$ was recorded on the strips in a suitably converted Sony video recorded (model EVA 300) and the time required for the sound to drop by more than 3 dB during playback of the still image was determined.

Abrasion was determined by reversing the aforesaid cassettes 54 times in the above mentioned video recorder under rapid forward and backward winding. The abrasion of magnetisable layer found on the head drum was determined qualitatively (1=no abrasion, 6=severe abrasion).

The extractibility is a measure of the cross-linking stability. A sample of the magnetic recording carrier is extracted in tetrahydrofuran for 24 hours at 20° C. and the percentage weight loss of the magnetisable layer is then determined.

The results obtained are shown in the following table.

TABLE

| Sample according to | Still Picture stability | Abrasion | Extractibility (% weight loss) |
|---|---|---|---|
| Example 1 | >60 min. | 1 | 0 |
| Example 2 | >60 min. | 1 | 5 |
| Comparison Example 3 | 20 min. | 4 | 20 |
| Example 4 | >60 min. | 2 | 3 |

The results show that for the same electroacoustic properties, magnetic recording carriers which have undergone the cross-linking reaction according to the invention have substantially better mechanical properties than recording carriers which have been cross-linked in accordance with the state of the art.

We claim:

1. In a non-aqueous process for the production of a magnetic recording carrier consisting of a layer support and at least one magnetisable layer applied to said support and containing finely divided magnetic pigment dispersed in a polymeric, cross-linked matrix, the cross-linking reaction of the polymeric binder taking place by way of oligo- and/or polyurethanes and/or polyurea containing oxadiazine trione rings.

2. In the process for the production of a magnetisable recording carrier according to claim 1, characterised in that the cross-linking reaction takes place in the presence of hydroxyl and/or aliphatic amino groups.

3. In the process for the production of a magnetic recording carrier according to claims 1 or 2, characterised in that the oligo- or polyurethanes containing oxadiazine trione rings are reaction products of A Polyisocyanates having a functionality of 1.95 to 2.05, preferably 1.99 to 2.01 and B Compound having predominantly two zerewitinoff active hydrogen atoms, selected from hydroxyl and/or amino compounds in the molecular weight range of from 18 to 6000, under the condition that the ratio of isocyanate groups present in A to zerewitinoff active hydrogen atoms present in B is in the range of from 0.75:1 to 1.1:1 and from 5 to 100 mol% of the polyisocyanates mentioned under A consist of polyisocyanates containing an oxadiazine trione ring.

4. In the process for the production of a magnetic recording carrier according to claims 1 or 2, characterised in that from 0 to 90% by weight of the components used for synthetizing the polymeric, cross-linked matrix consist of polymers which are free from oxadiazine trione and contain hydroxyl and/or amino groups while 100 to 1% by weight of said components consist of oligo- and/or polyurethane containing oxadiazine trione rings.

5. In the process for production of a magnetic recording carrier according to claims 1 or 2, characterised in that from 25 to 100 mol% of the polyisocyanates A used for synthetizing the oligo- and/or polyurethanes containing oxadiazine trione rings consist of polyisocyanates containing an oxadiazine trione ring and make up a total of 1 to 60% by weight of the total polymer matrix.

6. In the process for the production of a magnetic recording carrier according to claims 1 or 2, characterised in that from 5 to 25 mol% of the polyisocyanates A used for synthetizing the oligo- and/or polyurethanes containing oxadiazine trione rings consist of polyisocyanates containing an oxadiazine trione ring and those oligo- and/or polyurethanes contribute 30 to 100% by weight to the synthesis of the polymeric, cross-linked matrix.

7. In the process for the production of a magnetic recording carrier according to claims 1 or 2, characterised in that aliphatic and/or cycloaliphatic polyamines having a molecular weight below 2000 are added to the oligo- and/or polyurethane containing an oxadiazine trione ring and in that the ratio of amino groups to oxadiazine trione rings is in the range of from 5:1 to 1:4, preferably from 3:1 to 1:2.

8. In the process for the production of a magnetic recording carrier according to claims 1 or 2, characterised in that catalytic quantities of tertiary amines are added for hardening the magnetisable layer.

9. In the process for the production of a magnetic recording carrier according to claims 1 or 2, characterised in that the catalysts used are bicyclic amidines.

10. The process for the production of a magnetic recording carrier according to claims 1 or 2, wherein after applying to said support the magnetizable layer is dried and calendered, characterized in that the recording carrier is exposed to an atmosphere containing a tertiary amine either before or after the calendering process.

11. Magnetic recording carrier, characterised in that it has been produced by a process according to claims 1 or 2.

12. Magnetic recording carrier according to claims 1 or 2, characterised in that the finely divided magnetic pigments are powders based on metals or metal alloys.

13. Magnetic recording carrier according to claims 1 or 2, characterised in that $CrO_2$ is used as finely divided magnetic pigment.

14. Magnetic recording carrier according to claims 1 or 2, characterised in that Co-doped ferrites are used as finely divided magnetic pigments.

15. Magnetic recording carrier according to claims 1 or 2, characterised in that barium ferrite is used as finely divided magnetic pigment.

* * * * *